June 21, 1938. W. A. BUCKNER 2,121,244
QUICK COUPLING VALVE WITH RESILIENT COVER
Filed March 7, 1936
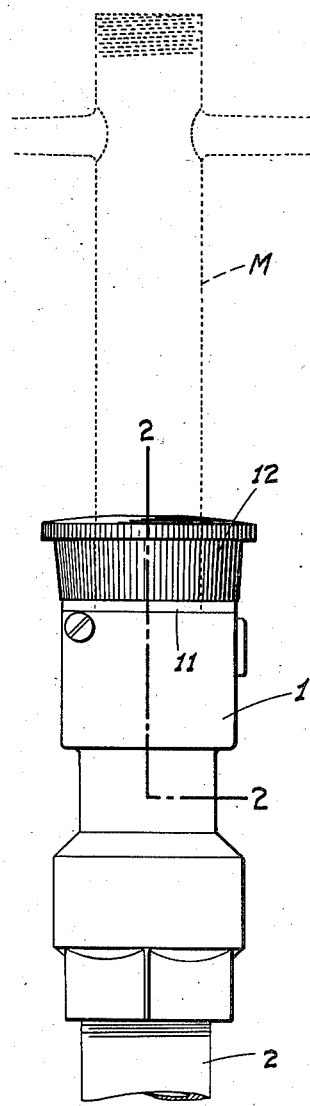
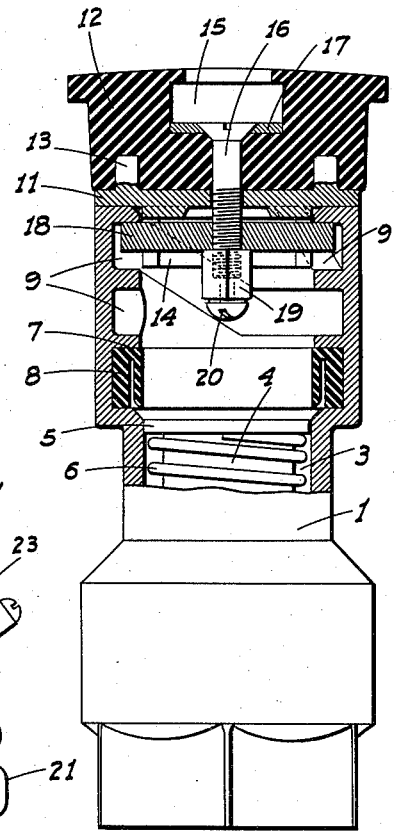
INVENTOR
Wm A. Buckner
BY
ATTORNEY Patented June 21, 1938

2,121,244

UNITED STATES PATENT OFFICE 2,121,244

QUICK COUPLING VALVE WITH RESILIENT COVER

William A. Buckner, Fresno, Calif.

Application March 7, 1936, Serial No. 67,674

4 Claims. (Cl. 220—40)

This invention relates generally to a quick coupling underground valve unit and, in particular, is an improvement over the quick coupling valve and cover illustrated in my United States patent #1,996,900 issued April 9th, 1935.

In the above mentioned United States patent, the body of the valve unit is shown as being of two sections, one threaded into the other and securing a flanged sealing washer or thimble therebetween. Not only is such structure expensive to manufacture but it is necessary to unthread one body section from the other in order to replace the washer. This is extremely objectionable due to the fact that the valve is disposed in the ground and must be unearthed in order to replace the washer.

It is therefore one of the objects of my invention to construct the valve unit with an easily manufactured one piece body provided with a sealing washer disposed so that it may be replaced through the opening in the top of the valve unit.

Although this improved valve unit may be provided with a hinged metal cover, as illustrated in the above mentioned patent, I prefer, and it is one of my objects, to provide the same with a rotary metal cover disc having a thick resilient head or cap which is especially useful on sports fields and the like where a metal cover would be dangerous and often injure players on the field due to the fact that in this type of valve unit the cover is adjacent the ground level.

An additional object of my invention is to provide a resilient cover head or cap which is so mounted that the resiliency of the cap is employed to frictionally hold the cover locking fingers in place.

A further object of my invention is to provide a securing chain for the cover which, when the cover is on the valve, will be entirely disposed within the valve and which chain, when the cover is off the valve, will be out of the way of the tubular coupling member which is projected into the valve.

These objects I accomplish by means of such structure and relative arrangement of parts as will fully appear by a perusal of the following specification and claims.

In the drawing similar characters of reference indicate corresponding parts in the several views:

Fig. 1 is a vertical elevation of my improved device.

Fig. 2 is a sectional view on line 2—2 of Figure 1.

Fig. 3 is a top plan of the valve unit with the cover removed.

Referring now more particularly to the characters of reference on the drawing, the valve unit comprises a body 1 tapped at its lower end for connection with a water supply pipe 2. A chamber 3 is formed in the body and a valve is disposed in such chamber and engages a valve seat formed therein—all in the manner illustrated in the above mentioned patent. This valve includes a tube 4, an outwardly flaring flange 5 engaging the walls of the chamber in slidable relation, and a spring 6 which engages the flange 5 and normally holds the valve closed.

Immediately above the upper end of chamber 3 the diameter of the body is enlarged and is formed with an internal annular groove 7 in which is disposed an endless ring like sealing washer 8, said washer being preferably formed of soft resilient rubber.

The body, above the groove 7 is formed with a pair of opposed helical and circumferentially extending grooves 9 in its internal wall. These grooves 9 extend to opposed openings at the top of the body as illustrated at 10 in Figure 3. The lower ends of said grooves 9 have blind terminations at a point immediately above the annular groove 7.

The cover comprises a flat circular metal disc 11 on which is mounted a flexible resilient and thick cap 12. Nubs 13 on the disc project into the cap and maintain the cap concentric with the disc and prevent relative rotation of the cap.

The lower face of the disc is formed with a depending concentric skirt 14 slotted on opposite sides as shown. The cap 12 is formed with a central opening or recess 15 which extends from the top of the cap to a point approximately half way through the same.

A bolt 16 whose head is supported by a washer 17 disposed in the recess, extends through aligned openings in the cap and disc and terminates below the skirt 14.

A locking finger or cross bar 18 is secured, intermediate its ends, on the bolt 16 by means of a nut 19, the outer ends of this finger projecting through the opposed slots in skirt 14.

One end of nut 19 is tapped to receive the threaded end of bolt 16, while the other end of the nut is tapped to receive a relatively small bolt 20 which secures one end of a chain 21 to the nut as illustrated in Figure 2. The other end of this chain is secured by a pin 22 in a recess 23 formed in the inner wall of the body and open to the upper end thereof.

Operation

In use, the cover is secured to the body of the valve in the following manner:

The ends of finger 18 are placed in the opposed openings 10 and the cover is turned by means of the cap, tending to force the ends of the fingers along in helical grooves 9. As the ends of the fingers move along in the helical groove, bolt 16 is drawn downward with resultant compression of that portion of the rubber cap between washer 17 and disc 11. Thus: the ends of finger 18 are held in firm frictional engagement in the helical grooves 9 by means of the resiliency of cap 13, and the entire cover is securely held in place.

When the cover is removed from the valve body, the chain is drawn out from within the body and due to the fact that the inner end is secured in a recess, it cannot possibly interfere with the valve opening operation which is performed by inserting a tubular coupling member M into the body of the valve unit as indicated generally in dotted lines in Figure 1, and as described in detail in the hereinbefore mentioned patent.

The sealing washer 8 disposed in annular groove 1, engages the sides of the tubular coupling member M and prevents leakage therepast.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a tubular body open at its upper end, a cover for the body comprising a rigid disc, a cross bar under the disc, the body having opposed helical grooves open to the top of the body to receive the ends of the bar when the cover is placed on the body whereby upon then rotating the cover the cross bar will move away from the cover, a central stem mounting for the cross bar, said stem projecting through the cover and having an enlarged head on its upper end, and an element of compressible material about the stem between and engaging the head and top of the cover.

2. A structure as in claim 1, in which said cross bar is rigid; and guide elements for said cross bar depending from the cover to prevent relative rotation of said bar without restricting axial movement thereof relative to the cover.

3. In combination, a tubular body open at its upper end, a cover for the body comprising a rigid disc, a cross bar under the disc, the body having opposed helical grooves open to the top of the body to receive the ends of the bar when the cover is placed on the body whereby upon then rotating the cover the cross bar will move away from the cover, a central stem mounting for the cross bar, said stem projecting through the cover and having an enlarged head on its upper end, an enlarged rigid washer supporting the head, and a thick compressible rubber cap on the cover, and extending about the stem and washer, said cap being recessed to receive the washer.

4. A device as in claim 1 including means between the element and cover to prevent relative rotation thereof.

WILLIAM A. BUCKNER.